United States Patent [19]

Brezoczky et al.

[11] Patent Number: 4,819,091
[45] Date of Patent: Apr. 4, 1989

[54] HIGH SPEED MAGNETIC DISK CONTACT RECORDING SYSTEM

[75] Inventors: Blasius Brezoczky, San Jose; Emil Hopner, Los Gatos, both of Calif.

[73] Assignee: International Business Machines Corporation, Armonk, N.Y.

[21] Appl. No.: 45,967

[22] Filed: Apr. 30, 1987

[51] Int. Cl.[4] .......................... G11B 5/012; G11B 5/22
[52] U.S. Cl. .................................. 360/97.01; 360/122
[58] Field of Search ............................... 360/103–104, 360/122, 119, 97–99

[56] References Cited

U.S. PATENT DOCUMENTS

| 3,919,717 | 11/1975 | Cullen et al. | 360/122 |
| 4,225,892 | 9/1980 | Bassett et al. | 360/113 |
| 4,418,472 | 12/1983 | Lorenze, Jr. | 360/122 X |
| 4,604,670 | 8/1986 | Visser | 360/127 |
| 4,731,683 | 3/1988 | Otomo et al. | 360/119 |

FOREIGN PATENT DOCUMENTS

| 53-29710 | 3/1978 | Japan | 360/103 |
| 57207408 | 6/1984 | Japan . | |
| 60-224109 | 8/1985 | Japan | 360/122 |
| 61-115204 | 2/1986 | Japan | 360/122 |

OTHER PUBLICATIONS

IBM Tech. Discl. Bull., vol. 27, No. 1B, Jun. 1984, p. 496, entitled "Single Crystal/Polycrystalline Film Head", by W. D. Kehr et al.

Primary Examiner—John H. Wolff
Attorney, Agent, or Firm—Otto Schmid, Jr.

[57] ABSTRACT

A high speed magnetic disk recording system is described in which the recording medium comprises a substrate having a magnetic coating thereon, and a magnetic recording transducer is operated in physical contact with the recording medium. The magnetic transducer comprises a single crystal material on at least the surface which contacts the recording medium. The single crystal material has a high thermal conductivity, a low friction coefficient and a high surface energy so that, when relative motion is provided between the magnetic recording transucer and the recording medium, an attractive force is generated which maintains the magnetic recording transducer in contact with the recording medium so that high density recorded data can be reliably written and sensed without excessive wear to either the magnetic transducer or the recording medium.

25 Claims, 3 Drawing Sheets

HIGH SPEED MAGNETIC DISK CONTACT RECORDING SYSTEM

BACKGROUND OF THE INVENTION

1. Field of the Invention

This invention relates in general to magnetic recording systems and, in particular, to a magnetic disk recording system in which the magnetic transducer is in contact with the storage medium at operating speed.

2. Description of the Prior Art

It has been recognized since the early days of moving magnetic storage systems that contact recording is desirable. R. L. Wallace, Jr. established the space loss relationship in his paper "The Reproduction of Magnetically Recorded Signals", Bell System Technical Journal, October, 1951, pp 1145–1173. This paper defines the spacing loss (i.e. loss of read signal amplitude) in terms of the distance d between the magnetic read head and the surface of the recording medium and the wavelength of the recorded signal.

Although contact is known to be a key factor in audio and video recording systems as well as floppy disks, in contrast, contact recording systems for high performance moving magnetic storage systems have not been widely used. The reason for this is that, in the moving magnetic recording system, the transducer must be capable of running on the same track for extended periods of time without damage to the recording medium. The contact recording systems for high speed moving magnetic recording that have been built have had the problem of excessive wear of both the magnetic transducer and the magnetic recording medium.

U.S. Pat. No. 4,225,892 to Bassett et al discloses a magnetoresistive read head which is deposited onto a single crystal sapphire substrate which has a particular crystallographic orientation as the wear surface.

IBM TDB June, 1984, p 496 by Kehr et al discloses a ferrite magnetic head having at least one surface formed of a single crystal manganese-zinc ferrite. The surface is etched to form a smooth pore-free surface.

The unexamined published Japanese patent application 57-207408 discloses the use of a single crystal corundum as a substrate for a magnetic head.

U.S. Pat. No. 3,919,717 to Cullen et al shows a wear resistant surface for magnetic heads comprising diamond particles in a matrix of a softer material such as rhodium, for example.

None of the references disclose a contact recording system which utilizes a single crystal material having the physical characteristics required to hold the slider in contact with the recording medium without external force during high speed recording and sensing operations.

SUMMARY OF THE INVENTION

It is therefore the principal object of this invention to provide a contact recording system for a high speed moving magnetic storage system in which an attractive force is generated so that high density recorded data can be reliably written and sensed without excessive wear to either the magnetic transducer or the recording medium.

In accordance with the invention, a high speed magnetic disk recording system is provided in which the recording medium comprises a substrate having a magnetic coating thereon, and a magnetic recording transducer in physical contact with the magnetic recording medium. The magnetic recording transducer comprises a substrate of a single crystal material having a high thermal conductivity, a low friction coefficient and a high surface energy. Means are provided to produce relative motion between the magnetic recording transducer and the recording medium whereby an attractive force is generated which maintains the magnetic recording transducer in contact with the recording medium so that high density recorded data can be reliably written and sensed.

The foregoing and other objects, features and advantages of the invention will be apparent from the following more particular description of a preferred embodiment of the invention as illustrated in the accompanying drawings.

DESCRIPTION OF THE PREFERRED EMBODIMENTS

Figure 1:
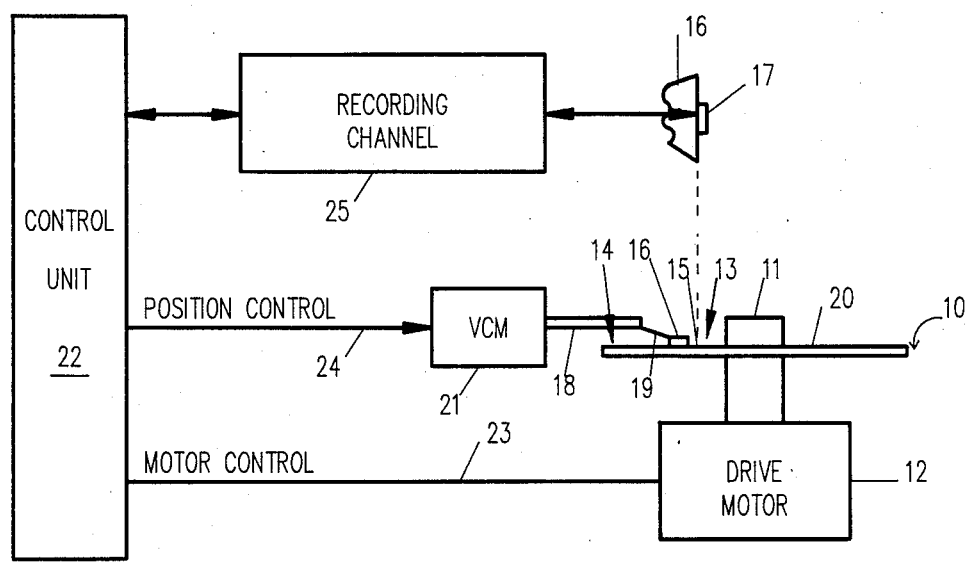
FIG. 1 is a simplified block diagram of a magnetic disk file present invention.

The present invention is described as embodied in a magnetic disk storage file as shown in FIG. 1. At least one rigid rotatable disk, such as disk 10 is supported on a spindle 11 and rotated by a disk drive motor 12. The magnetic recording medium 15 on each disk is in the form of an annular pattern of concentric data tracks having an inside diameter 13 and an outside diameter 14, as shown on disk 10.

At least one slider 16 is positioned in contact with the magnetic recording medium 15, and each slider 16 supports one or more read/write heads 17. The slider 16 is attached to an actuator arm 18 by means of a suspension 19. The suspensions 19 provide a slight spring force which biases the slider 16 against the disk surface 20. Each actuator arm 18 is attached to accessing mechanism such as a voice coil motor (VCM) 21, for example. The VCM is a coil movable within a fixed magnetic field, and the direction and velocity of the coil movement is controlled by the current supplied.

As the disk 10 rotates, the slider 16 is moved radially in and out so that the head 17 may access different portions of the disk surface 20 containing the data.

The above description of a magnetic disk storage file, and the accompanying illustration of it in FIG. 1 are for representative purposes only. It should be apparent that disk files may contain a large number of disks and VCMs and that each actuator arm may support a number of sliders. The present invention of a contact recording magnetic disk storage system is fully applicable to any such movable storage apparatus, provided it is of the type in which the sliders are in contact with the storage medium when at operating speed.

The various components of the disk file are controlled in operation by signals generated by control unit 22 which includes internal clock signals, logic control circuits, storage and a microprocessor. The control unit 22 generates control signals to control various disk file operations such as motor control signals on line 23 and position control signals on line 24. The control signals on line 24 provide the desired current profile to optimally move the selected slider 16 to the desired track on the associated disk 10. The READ and WRITE signals are communicated to and from read/write head 17 by means of recording channel 25.

Figure 2:
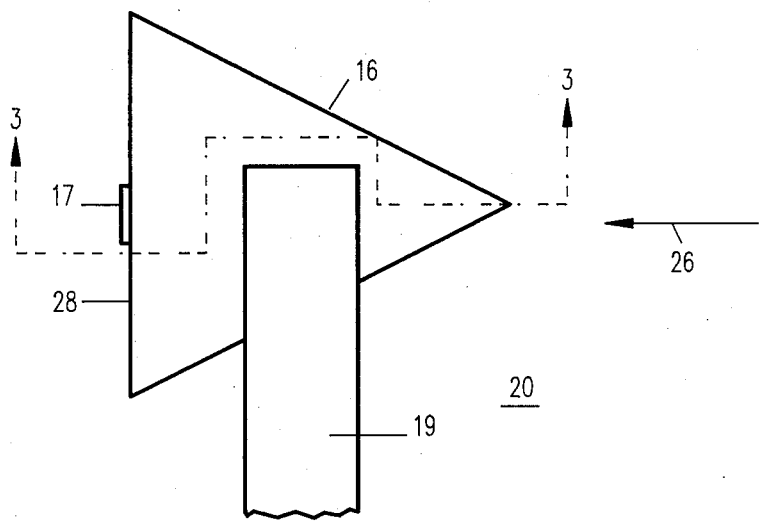
FIG. 2 is an enlarged top view showing the slider in FIG. 1 in greater detail.

In accordance with the present invention, as shown in FIG. 2, the slider 16 is positioned so that it is in contact with the recording medium at normal operating speed produced by relative motion, at a predetermined rate, between slider 16 and the surface 20 of the magnetic recording media 15 in the direction indicated by arrow 26.

The magnetic read/write head 17 preferably comprises a magnetic head formed by thin film deposition techniques such as the thin film transducer described in commonly assigned U.S. Pat. No. 4,190,872 to Jones, Jr. et al, for example. The magnetic read/write head 17 is deposited on surface 28 of the slider 16 which is substantially normal to the surface 27 of the slider which is in contact with the recording medium.

It is a feature of the present invention that the slider remains in direct contact with the disk surface even when the relative motion between the slider and disk surface reaches speeds of 20 meters per second or greater. This is accomplished by an attractive force that is strong enough to overcome the force of the film of air which is moving with the disk surface which tends to force the slider away from the disk surface. The attractive force is believed to be produced by a phenomenon known as contact electrification, although others have attempted to explain the operation based on Van der Waal's force. These phenomena have been known for years although they are not well understood in their detailed workings. However, by the use of the specific materials' characteristics for the slider and disk, it has been shown that direct and continuous contact between slider and disk surface can be assured without causing excessive wear to either the magnetic transducer slider or the recording medium.

Contact electrification works on the principle that, when two materials are rubbed together, electrical charge is usually transferred from one material to the other. When two insulators are involved, as in the present case, the electrical charge transfer is by way of an ion transfer from one insulator to the other. It is also believed that a temperature difference can result in charge transfer. If the temperature of the two insulators differs, the two currents resulting from the ionic transfer will not balance unless the two thermionic currents alter. This results in the following relationship:

$\Delta U \approx (\Delta T\, U_1/T_1)$
where $\Delta T = T_2 - T_1$ $\Delta U = U_2 - U_1$ $\Delta U$ is the energy difference and this factor is proportional to the attractive force generated between the two insulators. In the present case, the materials characteristics are chosen so that the temperature of the surface of the slider which is in contact with the recording medium is a lower temperature than that of the recording medium. Should the materials characteristics be chosen so that the temperature of the surface of the slider is greater then, greater wear and possibly destructive wear of the slider would occur.

Figure 3:
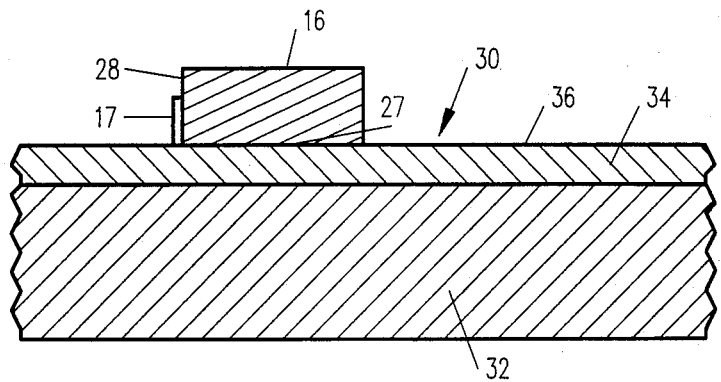
FIG. 3 is a section view taken along lines 3—3 of FIG. 2.
Figure 4:
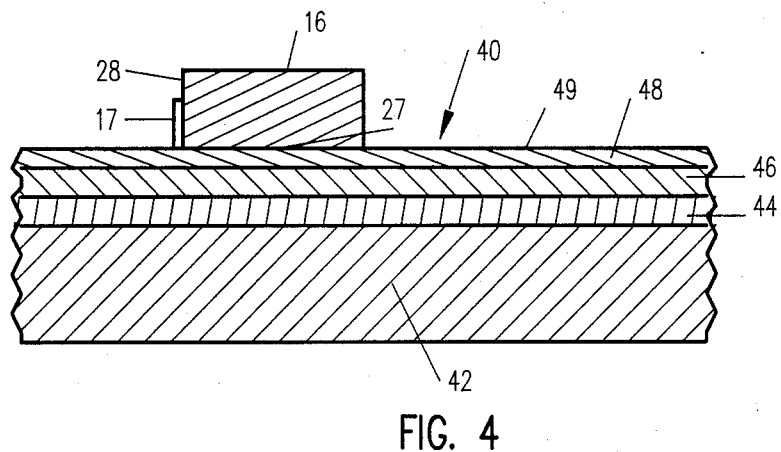
FIG. 4 is a section view of the slider with an alternate embodiment of the recording medium.

According to the present invention, as shown in FIGS. 2–4, the slider is made from a single crystal material having a high thermal conductivity, a low friction coefficient, high surface energy and a material that is electrically non-conductive. The slider material will be maintained in direct contact with the disk surface during normal operation of the disk file due to the attractive force between the slider 16 and the disk surface 20.

In a specific embodiment, slider 16 is made from a single crystal diamond cut so that its crystalline orientation is <110> for the surface 27 which is in contact with the disk surface 20. Another suitable material is a single crystal cubic boron nitride. These materials have properties, when operated in contact with a magnetic disk of the type described in greater detail below, which result in contact being maintained between slider and disk surface without causing excessive wear of either slider or disk surface.

The properties for the single crystal material include high thermal conductivity, a low friction coefficient, a high surface energy, and a high hardness. The thermal conductivity enables the slider material to maintain a lower temperature than the surface of the magnetic medium. The low friction coefficient prevents wear of the surface of the magnetic medium which is in contact with the slider. The high surface energy prevents the slider surface from picking up contamination which may be present in the system and the hardness prevents plastic deformation and wear of the slider.

The single crystal diamond material was chosen since its thermal conductivity is high (ten times higher than single crystal sapphire) at room temperature, its friction coefficient is low (four times lower than single crystal sapphire), its surface energy is high (six times higher than single crystal sapphire), and its hardness is high (four and one-half times harder than single crystal sapphire). The comparisons are given to single crystal sapphire since this material is the most attractive, by its characteristics, of any of the materials disclosed in the prior art references discussed in the Background of the Invention section of this application. The other materials discussed there would therefore be even less suitable for the present invention than the single crystal sapphire material.

The single crystal material chosen should have a surface energy above 5000 ergs/cm$^2$, a high thermal conductivity, a friction coefficient lower than 0.1, and a hardness above 3500 kg/mm$^2$. Single crystal diamond and single crystal cubic boron nitride are two materials which have the desired characteristics.

The slider 16 is formed in the shape of an isosceles triangle with the apex of the triangle along the line of relative motion, which may be 3600 RPM, or greater, between the slider and the surface of the recording medium. The magnetic read/write head is formed on the trailing end of slider 16 with respect to the relative motion. The triangular shape of the slider and the position of the slider counteracts any tendency for the slider to be moved off-track by the film of air which is moving with the disk surface.

The recording medium comprises a substrate having a magnetic coating thereon. In the specific embodiment shown in FIG. 3, the recording medium 30 is a particulate magnetic disk. The recording medium 30 comprises a substrate 32 made of an aluminum alloy, for example, having a particulate magnetic coating 34 thereon. The magnetic coating comprises magnetic particles in an epoxy-resin binder, and the coating may also have alumina particles, if desired The magnetic coating is cured and buffed to a chosen surface finish and a small quantity of a liquid lubricant is deposited on the surface 36 of the recording medium. It was unexpected that a non-overcoated particulate disk could be used in a contact recording system with the slider 16 in contact with surface 36 without exhibiting excessive wear. It is apparent that an overcoated particulate magnetic disk may also be used, if desired.

In the embodiment shown in FIG. 4, the recording medium 40 is a thin film magnetic disk. The recording medium 40 comprises a substrate 42 made of an Al-Mg alloy, for example, an undercoat 44 of a material such as chromium, for example, a magnetic coating 46 of a cobalt based alloy, for example, and a protective overcoat 48 of a material such as carbon. The slider 16 is positioned in contact with the surface 49 of the recording medium 40 under normal operating conditions of a disk storage file without producing excessive wear. In a specific embodiment a triangular shaped slider comprising a single crystal diamond 3 mm on a side and 1 mm thick was operated in contact with a carbon overcoated recording medium, and an attractive force of 18 grams was generated.

Figure 5:
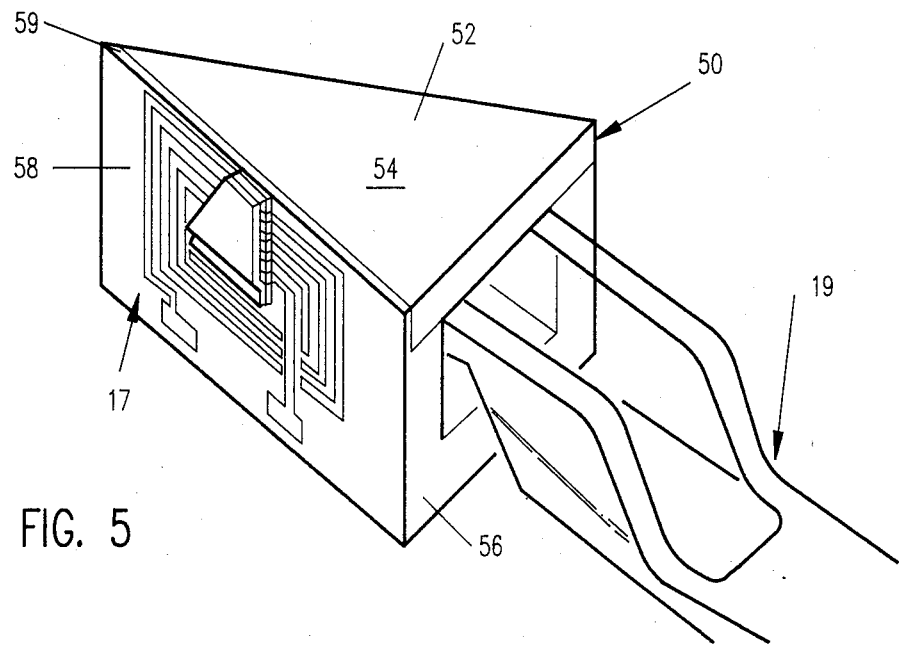
FIG. 5 is a three dimensional view of an alternate embodiment of the slider.

It is not necessary to have a slider which is made of a single material in all cases provided that the material which contacts the surface of the recording medium has sufficient thickness to provide the required wear and thermal characteristics. One embodiment of a composite slider is shown in FIG. 5. In this embodiment the slider 50 comprises a thin sheet 52 of a single crystal material which forms the surface 54 which is in contact with the recording medium. The thin sheet 52 of single crystal material is bonded to a slider body 56 which is made of a suitable material such as a ceramic comprising a mixture of $Al_2O_3$ and TiC. The suspension 19' is attached to the slider body 56, and the magnetic read/write head 17 is formed on surface 58 of the slider 50. If desired, a non-conductive coating 59 such as alumina, for example, may be deposited on surface 58 prior to deposition of the magnetic transducer 17.

Figure 6:
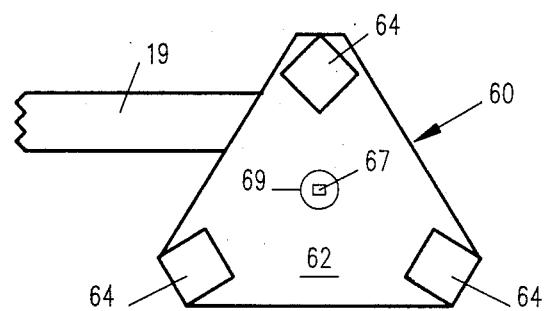
FIG. 6 is a bottom view of a further embodiment of the slider.
Figure 7:
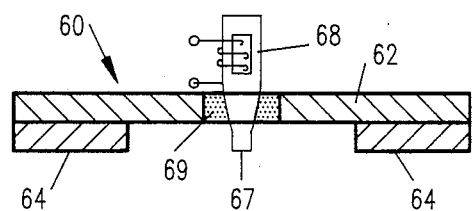
FIG. 7 is a section view taken along lines 7—7 of FIG. 6.

In a further embodiment of the slider shown in FIGS. 6 and 7, the slider 60 comprises a triangular shaped slider body 62 of a suitable material such as stainless steel, having a plurality of contacting members 64 which contact the recording medium. Contacting members 64 are bonded to the slider body 62 and members 64 are made from a single crystal material having characteristics as stated above. The area of the contacting members 64 is chosen compared to the area of pole tip area 67 of magnetic read/write transducer 68 so that sufficient attractive force can be generated to maintain slider 60 in contact with the recording medium during normal operation of the disk file. The magnetic read/write transducer 68 is centrally located.

In this case the transducer is formed of a suitable magnetic material such as a ferrite material and the transducer 68 is bonded in position in central opening 69 in slider body 62.

Figure 8:
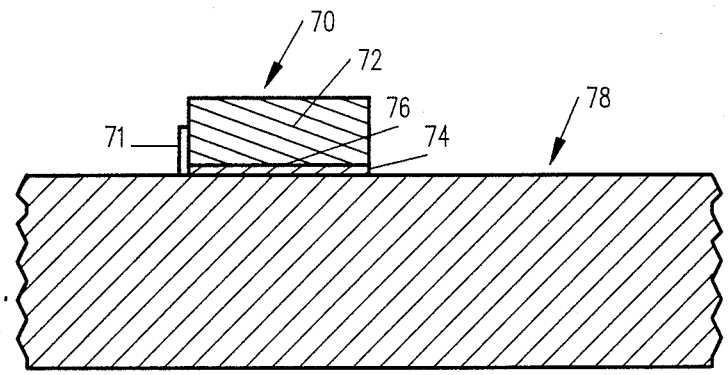
FIG. 8 is a section view of another embodiment of the slider.

A further embodiment of the slider 70 is shown in FIG. 8 along with magnetic read/write transducer 71 in which the slider body 72 comprises a first single crystal material such as sapphire, for example, upon which is deposited an epitaxially grown layer 74 of single crystal material. It has been found that a layer having a thickness of about 250 angstroms can provide the characteristics required to insure contact between the surface 76 of slider 70 and the recording medium 78.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new and desire to secure by letters patent is:

1. A high speed magnetic disk contact recording system comprising:
   a magnetic recording medium comprising a rigid substrate having a magnetic coating thereon,
   a magnetic recording transducer and means to support said transducer in physical contact with said magnetic recording medium, said magnetic recording transducer comprising a substrate of a nonconducting single crystal material having a high thermal conductivity, a low friction coefficient and a high surface energy, and
   means to produce relative motion between said magnetic recording medium and said magnetic recording transducer up to a selected operating speed to produce a force of a magnitude by which said transducer is capable of running in contact with said recording medium without the application of external force whereby said magnetic recording is maintained in continuous and direct contact with said magnetic recording medium during said relative motion at said selected operating speed so that high density recorded data can be reliably written and sensed without excessive wear to either said transducer or said recording medium.

2. The high speed magnetic disk contact recording system of claim 1 wherein said single crystal material comprises a single crystal diamond.

3. The high speed magnetic disk contact recording system of claim 2 wherein said single crystal diamond is cut so that its crystalline orientation is <110>.

4. The high speed magnetic disk contact recording system of claim 1 wherein said single crystal material comprises a single crystal cubic boron nitride.

5. The high speed disk contact recording system of claim 1 wherein said single crystal material has a high thermal conductivity, a friction coefficient lower than 0.1 and a surface energy above 5000 ergs/$cm^2$.

6. The high speed magnetic disk contact recording system of claim 1 wherein said magnetic recording medium comprises a particulate magnetic disk.

7. The high speed magnetic disk contact recording system of claim 1 wherein said magnetic recording medium comprises a thin film magnetic disk.

8. A high speed magnetic disk contact recording system comprising:
   a magnetic recording medium comprising a rigid substrate having a magnetic coating thereon,
   a magnetic recording transducer and means to support said transducer in physical contact with said magnetic recording medium, said magnetic recording transducer comprising a slider body, said slider body having a surface in contact with said magnetic recording medium comprising a nonconducting single crystal material, said single crystal material having a high surface energy, and means to produce relative motion between said magnetic recording medium and said magnetic recording transducer up to a selected operating speed to produce a force of a magnitude by which said transducer is capable of running in contact with said recording medium without the application of external force whereby said magnetic recording transducer is maintained in continuous and direct contact with said magnetic recording medium during said relative motion at said selected operating speed so that high density recorded data can be reliably written and sensed without excessive wear to either said transducer or said recording medium.

9. The high speed magnetic disk contact recording system of claim 8 wherein said single crystal material extends substantially over all of said surface in contact with said magnetic recording medium.

10. The high speed magnetic disk contact recording system of claim 9 wherein said single crystal material comprises a single crystal diamond.

11. The high speed magnetic disk contact recording system of claim 10 wherein said single crystal diamond is cut so that its crystalline orientation is <110>.

12. The high speed magnetic disk contact recording system of claim 9 wherein said single crystal material comprises a single crystal cubic boron nitride.

13. The high speed magnetic disk contact recording system of claim 9 wherein said single crystal material has a high thermal conductivity, a friction coefficient lower than 0.1 and a surface energy above 5000 ergs/cm$^2$.

14. The high speed magnetic disk contact recording system of claim 9 wherein said slider body comprises a second single crystal material.

15. The high speed magnetic disk contact recording system of claim 14 wherein said single crystal material in contact with said magnetic recording medium is epitaxially grown.

16. The high speed magnetic disk contact recording system of claim 15 wherein said single crystal material in contact with said magnetic recording medium has a thickness of about 250 angstroms.

17. The high speed magnetic disk contact recording system of claim 8 wherein said magnetic recording medium comprises a particulate magnetic disk.

18. The high speed magnetic disk contact recording system of claim 8 wherein said magnetic recording medium comprises a thin film magnetic disk.

19. The high speed magnetic disk contact recording system of claim 8 wherein said single crystal material comprises a plurality of separate areas which contact the magnetic recording medium.

20. The high speed magnetic disk contact recording system of claim 19 wherein said single crystal material comprises a single crystal diamond.

21. The high speed magnetic disk contact recording system of claim 20 wherein said single crystal diamond is cut so that its crystalline orientation is <110>.

22. The high speed magnetic disk contact recording system of claim 19 wherein said single crystal material comprises a single crystal cubic boron nitride.

23. The high speed magnetic disk contact recording system of claim 19 wherein said single crystal material has a high thermal conductivity, a friction coefficient lower than 0.1 and a surface energy above 5000 ergs/cm$^2$.

24. The high speed magnetic disk contact recording system of claim 19 wherein said magnetic recording medium comprises a particulate magnetic disk.

25. The high speed magnetic disk contact recording system of claim 19 wherein said magnetic recording medium comprises a thin film magnetic disk.

* * * * *